March 18, 1952 — E. SOKOLIK — 2,589,444

SIDE DRAFT COMPENSATING AND STEERING WHEEL

Filed March 14, 1947

INVENTOR

Edward Sokolik

Patented Mar. 18, 1952

2,589,444

UNITED STATES PATENT OFFICE 2,589,444

SIDE DRAFT COMPENSATING AND STEERING WHEEL

Edward Sokolik, New Brighton, Minn.

Application March 14, 1947, Serial No. 734,788

1 Claim. (Cl. 301—43)

My present invention relates to side draft compensating and steering wheels for side draft implements and machinery and the object is to eliminate the side draft without requiring the propulsion of the wheel to be constantly angular causing a heavy draft and inefficiency in the performance of the implements or machinery.

A further object of my invention is to prevent side skidding of the side draft compensating and steering wheels.

To this end, I provide a novel wheel which automatically counteracts the side draft by offsetting itself to compensate the side draft, as will be apparent in the proceeding specification.

In the drawings like characters designate like parts.

Figure 1:
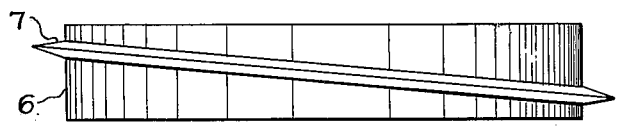
Figs. 1 and 2 are a plan view of a wheel-rim provided with a single helix rib of a V type.
Figure 2:
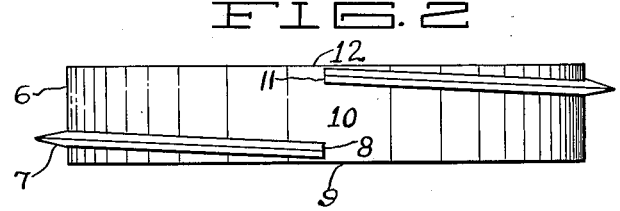

Referring to Figs. 1 and 2 the rim 6 is provided with a V rib 7 of a single helix. The rib end 8 is fastened onto said rim 6 on one side 9 of the longitudinal centre 10 thereof, circumscribing said rim 6 and terminating in the end 11 on the other side 12 of said longitudinal centre 10 opposite the other end 8 thereof. This V type of rib 7 takes less power to propel than other types as it cuts into the earth instead of being pressed thereinto. The side draft compensating efficiency of this type of rim is not so profound as of the following modifications and is effected by the propulsion of the wheel against the helical rib 7, which also counteracts side skidding, but the harder the ground the more the compensating efficiency is amplified, and if the rib 7 were perpendicular to the rim 6 on the off side, the compensating efficiency would be further amplified.

Figure 3:
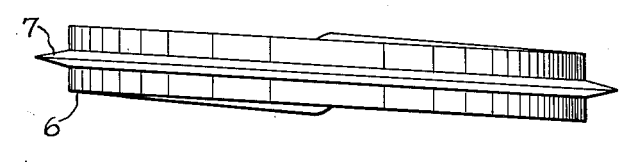
Figs. 3 and 4 are a plan view of a wheel having a rim of a single helix provided with a rib of the V type.
Figure 4:
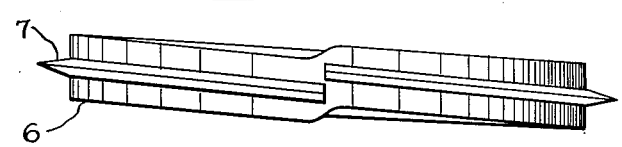

In the modification Figs. 3 and 4 like numerals designate like parts, and the rim 6 is of a single helix circumscribed by a V rib 7, and the compensating is effected as it rolls on the ground. The V rib 7 functions mostly to eliminate side skidding though a slight compensating is effected. The rib 7 is parallel to the rim 6.

Figure 5:
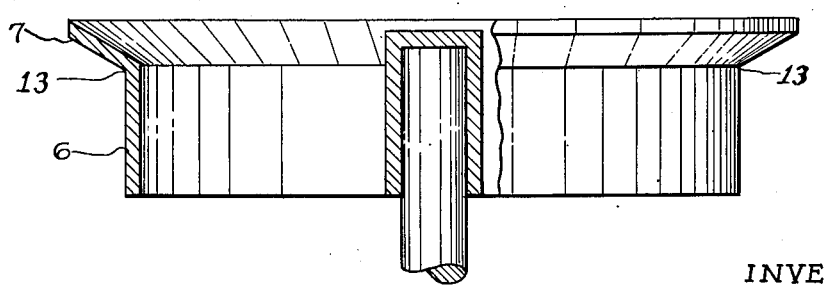
Fig. 5 is a view partly in plan view and partly in section of a wheel-rim provided with a flange oblique to the rim.

In the modification, Fig. 5, like numerals designate like parts and rim 6 circumscribed by the flange on the edge 13. The tread face of flange 7 is oblique to the rim 6 and its function is also dual that of counteracting side skidding and counteracting side draft. The side draft compensating is effected by the oblique sinking of said flange 7 into the ground offsetting the wheel in opposition to the side draft.

Modifications of this invention are possible without affecting the merits of the subjoined claim.

What I claim is:

A wheel for use in conjunction with implements having a side draft, said wheel including a tread rim consisting of a single helix provided with a flange or rib, said helix having the ends thereof sufficiently oppositely offset and connected to each other in a manner to cause the steering wheel to counteract and compensate a side draft of predetermined intensity as the implement is being propelled, thereby permitting rectilinear alignment and propulsion of said steering wheel and consequently of the implement, whereby the side draft or drag of the implement is eliminated and the propulsion thereof facilitated, and said flange or rib encircling and being secured to the periphery of said tread rim, thereby counteracting lateral skidding of the wheel.

EDWARD SOKOLIK.

REFERENCES CITED

The following references are of record in the file of this patent:

UNITED STATES PATENTS

| Number | Name | Date |
|---|---|---|
| 168,866 | Berry | Oct. 19, 1875 |
| 514,522 | Tucker | Feb. 13, 1894 |
| 636,012 | Strong | Oct. 31, 1899 |
| 686,822 | Macphail | Nov. 19, 1901 |
| 851,055 | Beskow | Apr. 23, 1907 |
| 881,728 | Silverwood | Mar. 10, 1908 |
| 981,398 | Durbin | Jan. 10, 1911 |

FOREIGN PATENTS

| Number | Country | Date |
|---|---|---|
| 14,453 | Great Britain | Oct. 24, 1887 |
| 489,359 | Great Britain | Oct. 22, 1936 |